US010900700B2

(12) United States Patent
Garrabrant et al.

(10) Patent No.: US 10,900,700 B2
(45) Date of Patent: Jan. 26, 2021

(54) SORPTION HEAT PUMP AND CONTROL METHOD

(71) Applicant: Stone Mountain Technologies, Inc., Johnson City, TN (US)

(72) Inventors: Michael A. Garrabrant, Unicoi, TN (US); Roger E. Stout, Unicoi, TN (US)

(73) Assignee: Stone Mountain Technologies, Inc., Unicoi, TN (US)

(*) Notice: Subject to any disclaimer, the term of this patent is extended or adjusted under 35 U.S.C. 154(b) by 89 days.

(21) Appl. No.: 16/300,292

(22) PCT Filed: May 11, 2017

(86) PCT No.: PCT/US2017/032175
§ 371 (c)(1),
(2) Date: Nov. 9, 2018

(87) PCT Pub. No.: WO2017/197124
PCT Pub. Date: Nov. 16, 2017

(65) Prior Publication Data
US 2019/0128582 A1 May 2, 2019

Related U.S. Application Data

(60) Provisional application No. 62/334,664, filed on May 11, 2016.

(51) Int. Cl.
*F25B 49/04* (2006.01)
*F25B 15/04* (2006.01)
(52) U.S. Cl.
CPC ............ *F25B 49/043* (2013.01); *F25B 15/04* (2013.01); *F25B 2315/002* (2013.01);
(Continued)

(58) Field of Classification Search
CPC ............ F25B 2315/002; F25B 2500/08; F25B 2700/2116; F25B 2700/21161; F25B 29/006; F25B 49/043
See application file for complete search history.

(56) References Cited

U.S. PATENT DOCUMENTS

| 4,667,485 A | 5/1987 | Ball et al. |
| 5,249,436 A | 10/1993 | Hemsath |

(Continued)

FOREIGN PATENT DOCUMENTS

| CN | 101545695 A | 9/2009 |
| CN | 101545697 A | 9/2009 |

(Continued)

OTHER PUBLICATIONS

The Extended European Search Report dated Feb. 26, 2020, of counterpart European Application No. 17796848.4.

(Continued)

*Primary Examiner* — Cassey D Bauer
(74) *Attorney, Agent, or Firm* — DLA Piper LLP (US)

(57) ABSTRACT

A method operates an absorption heat pump system, specifically the flow of hydronic cooling fluid through the condenser during system start-ups, or when the cooling fluid temperature is low. To minimize the time for an absorption heat pump to reach full cooling or heating capacity, it is desirable for the high side pressure to increase as fast as possible, and the low side pressure to decrease as fast as possible. Since the high side pressure is a function of the temperature of the refrigerant exiting the condenser, if the condenser cooling fluid temperature is low, the corresponding high side pressure will be low, which may not permit adequate working fluid flow rates from the high pressure side of the system to the low pressure side.

11 Claims, 4 Drawing Sheets

(52) U.S. Cl.
CPC . *F25B 2339/047* (2013.01); *F25B 2400/0403* (2013.01); *F25B 2500/08* (2013.01); *F25B 2500/26* (2013.01); *F25B 2600/2501* (2013.01); *F25B 2600/2519* (2013.01); *F25B 2700/2116* (2013.01); *Y02A 30/27* (2018.01); *Y02B 30/62* (2013.01)

(56) References Cited

U.S. PATENT DOCUMENTS

| | | | |
|---|---|---|---|
| 5,456,086 | A | 10/1995 | Hanna |
| 5,572,884 | A | 11/1996 | Christensen et al. |
| 6,332,328 | B1* | 12/2001 | Bangheri ............... F25B 49/043 62/141 |
| 6,718,792 | B1 | 4/2004 | Sarkisian et al. |
| 7,347,057 | B1 | 3/2008 | Garrabrant et al. |
| 7,631,515 | B2 | 12/2009 | Jacobi |
| 2012/0000220 | A1* | 1/2012 | Altay ..................... B64D 13/06 62/101 |

FOREIGN PATENT DOCUMENTS

| | | |
|---|---|---|
| CN | 101900451 A | 12/2010 |
| DE | 32 04 288 | 8/1983 |
| JP | 57-174667 | 10/1982 |
| JP | 61-186766 | 8/1986 |
| JP | 05-248726 | 9/1993 |
| JP | H07-139842 A | 6/1995 |
| JP | 3003554 | 1/2000 |
| JP | 2008-025915 A | 2/2008 |

OTHER PUBLICATIONS

The Partial Supplementary European Search Report dated Nov. 20, 2019, of counterpart European Application No. 17796848.4.

The First Office Action dated May 29, 2020, of counterpart Chinese Application No. 201780029416.8, along with an English translation.

* cited by examiner

SORPTION HEAT PUMP AND CONTROL METHOD

GOVERNMENT LICENSE RIGHTS

This invention was made with government support under Grant DE-EE0006116 awarded by the Department of Energy. The government has certain rights in the invention.

TECHNICAL FIELD

This disclosure relates to methods and systems that control a sorption heat pump. In particular, this disclosure relates to methods and systems that control the flow of hydronic fluid to a condenser.

BACKGROUND

Heat activated absorption cycles, using a wide variety of working fluids, have been utilized to provide cooling, refrigeration, and heating for many years. Absorption cycles utilize heat energy as the primary energy source, instead of mechanical work (most commonly using compressors driven by electric motors) utilized by vapor-compression heat pump cycles. The most common working fluids for absorption cycles are ammonia-water ($NH_3$—$H_2O$) and lithium bromide-water (LiBr—$H_2O$), although there are many other suitable combinations.

An absorption heat pump transfers low grade (low temperature) heat and 'pumps' it up to a higher, more useful temperature, using a higher grade energy source (combustion of fossil fuels, solar, thermal or waste heat, for example). The resulting heating cycle efficiency is greater than 100% (typically 150-200%) depending upon the cycle and temperatures involved (or more accurately, a coefficient of performance (COP) 1.5-2.0 based on the total delivered heat output divided by the higher grade heat input). In a domestic water heating application, the low grade heat energy source is typically indoor or outdoor ambient air (although other sources such as geothermal can also be used), and water is heated from typical ground temperatures (approximately 35-80° F.) to 110-160° F. For space heating applications, the low grade heat energy source is outdoor ambient air or geothermal, and a hydronic fluid connected to a building internal heating system, is typically heated to a temperature of 90 to 160° F.

An absorption heat pump comprises several specialized heat exchangers, some operating at a higher pressure, others at a lower pressure, and a solution pump moving the cycle working fluids from the low pressure side to the high pressure side. A refrigerant is desorbed from an absorbent in the desorber at the high pressure using thermal energy from a suitable heat source. This refrigerant vapor is condensed to a liquid in the condenser. The saturation temperature of the refrigerant liquid exiting the condenser determines the value of the high side pressure (a lower saturation temperature corresponds to a lower high side pressure). The liquid refrigerant exiting the condenser is expanded to the low side pressure using a throttling valve or fixed restriction (orifice or capillary tube) before entering the evaporator where it is vaporized by the low-grade energy source (typically outdoor air or a geothermal sink). The temperature of the low-grade energy source determines the value of the low side pressure since the low side pressure corresponds to a boiling temperature of the refrigerant lower than the low-grade energy source. Absorbent weak in refrigerant exiting the desorber is also expanded to the low side pressure using a throttling valve or fixed restriction, and enters the absorber along with the low pressure refrigerant exiting the evaporator where the refrigerant vapor is absorbed into the absorbent. The refrigerant-absorbent liquid exiting the absorber is pumped back to the high side pressure where it enters the desorber to start the cycle again.

For the cycle to function properly, the heat pump working fluids (refrigerant and absorbent) must continuously flow back to the low side pressure portion of the system (to the pump) from the high side pressure portion of the system through the restriction devices. The differential pressure between the high and low sides provides for this flow. If the differential pressure is not high enough, the working fluid flow rates may decrease and may not allow the absorption system to work properly, or cause operational problems.

For heating applications, a fluid (typically a hydronic fluid such as water or a glycol-water mixture) may be circulated through the condenser and absorber to collect the heat of condensation and absorption, increasing its temperature. The heated hydronic fluid may then be used to heat a load, which could be air inside a building (space heating, for example) or water in a storage tank (domestic hot water heating, for example). The hydronic fluid may flow through the condenser and absorber in series, parallel, or some combination thereof. To maximize cycle efficiency, it is desirable to cool the absorber to the maximum extent possible, and for the high side pressure to be as low as possible. For absorption heating cycles, the maximum efficiency may be obtained using a parallel flow configuration of the hydronic fluid through the condenser and absorber.

It is highly desirable for the heating or cooling capacity of an absorption heat pump to increase quickly to the maximum possible after the system is started to maximize efficiency and provide optimal customer satisfaction. When an absorption system is activated after being in an off mode for a period of time, the pressure differential between the high side and low side is often very low or zero. When the system is activated and heat applied to the desorber, the high side pressure will start to increase as refrigerant vapor is generated and enters the condenser. However, the initial flow rate of refrigerant vapor may be low, as is the temperature of the condenser heat exchanger (typically constructed of steel), so the high side pressure will often rise very slowly. Therefore the pressure difference between the high side and low side increases slowly, causing the circulation rate of the working fluids between the high side and low side to be low and the system heating or cooling capacity to increase slower than desired.

For heating applications, especially domestic hot water applications where a heat pump is used to heat cold water in a storage tank, the temperature of hydronic fluid at system start-up may be very low. The hydronic temperature at start-up for a space heating application may also be very low if the heating system has been in an off mode for an extended period. When the hydronic fluid temperature flowing through the condenser and absorber is low, the refrigerant temperature exiting the condenser will also be low, resulting in a low high side pressure. This may create a situation where the pressure difference between the high side and low side is insufficient for the heat pump to operate, or operate without problems. In extreme cases where the hydronic temperature is low and the low-grade heat source coupled to the evaporator is warm (such as domestic hot water heating on a hot day), the saturation pressure difference between the high side and low side may be very low, or potentially even negative.

Using a series configuration for the hydronic loop, where the hydronic fluid first passes through the absorber (where the hydronic is heated to a higher temperature) prior to entering the condenser, provides the benefit of faster start-ups and improved operation at low hydronic temperatures by increasing the hydronic temperature entering the condenser. However, this practice decreases the maximum efficiency of the heat pump after the start-up period by causing the high side pressure to be higher than necessary. A series configuration can also limit how high the hydronic temperature can be heated, due to the maximum working pressure of the heat pump components.

SUMMARY

We provide a method of controlling a sorption heat pump including a condenser and an absorber. The method includes measuring the temperature of hydronic fluid entering or existing in the condenser and controlling a flow rate of the hydronic fluid entering the condenser in response to the temperature measured, whereby the flow rate of hydronic fluid entering the condenser is reduced relative to a total possible flow rate when the temperature is below a pre-determined value.

We also provide a sorption heat pump control system including a condenser that condenses the hydronic fluid into a liquid, an absorber that absorbs heat from the hydronic fluid, a temperature sensor that measures a temperature of hydronic fluid entering or exiting the condenser, and a controller that controls a flow rate of the hydronic fluid entering the condenser in response to the temperature of the hydronic fluid entering or exiting the condenser, wherein the flow rate of hydronic fluid entering the condenser is reduced relative to a total possible flow rate when the temperature is below a pre-determined value.

We also provide a method of controlling a sorption heat pump including a condenser and an absorber. The method includes reducing a flow rate of hydronic fluid entering the condenser relative to a total possible flow rate for a predetermine amount of time following activation of the heat pump from an off mode.

We also provide a sorption heat pump control system including a condenser that condenses a refrigerant into a liquid such that heat of condensation is transferred to a hydronic fluid, an absorber that provides for the refrigerant to be absorbed into an absorbent such that heat of absorption is transferred to the hydronic fluid, and a controller that controls a flow rate of the hydronic fluid entering the condenser, whereby the flow rate of hydronic fluid entering the condenser is reduced relative to a total possible flow rate for a predetermined amount of time following activation of the heat pump from an off mode.

DETAILED DESCRIPTION

Figure 1:
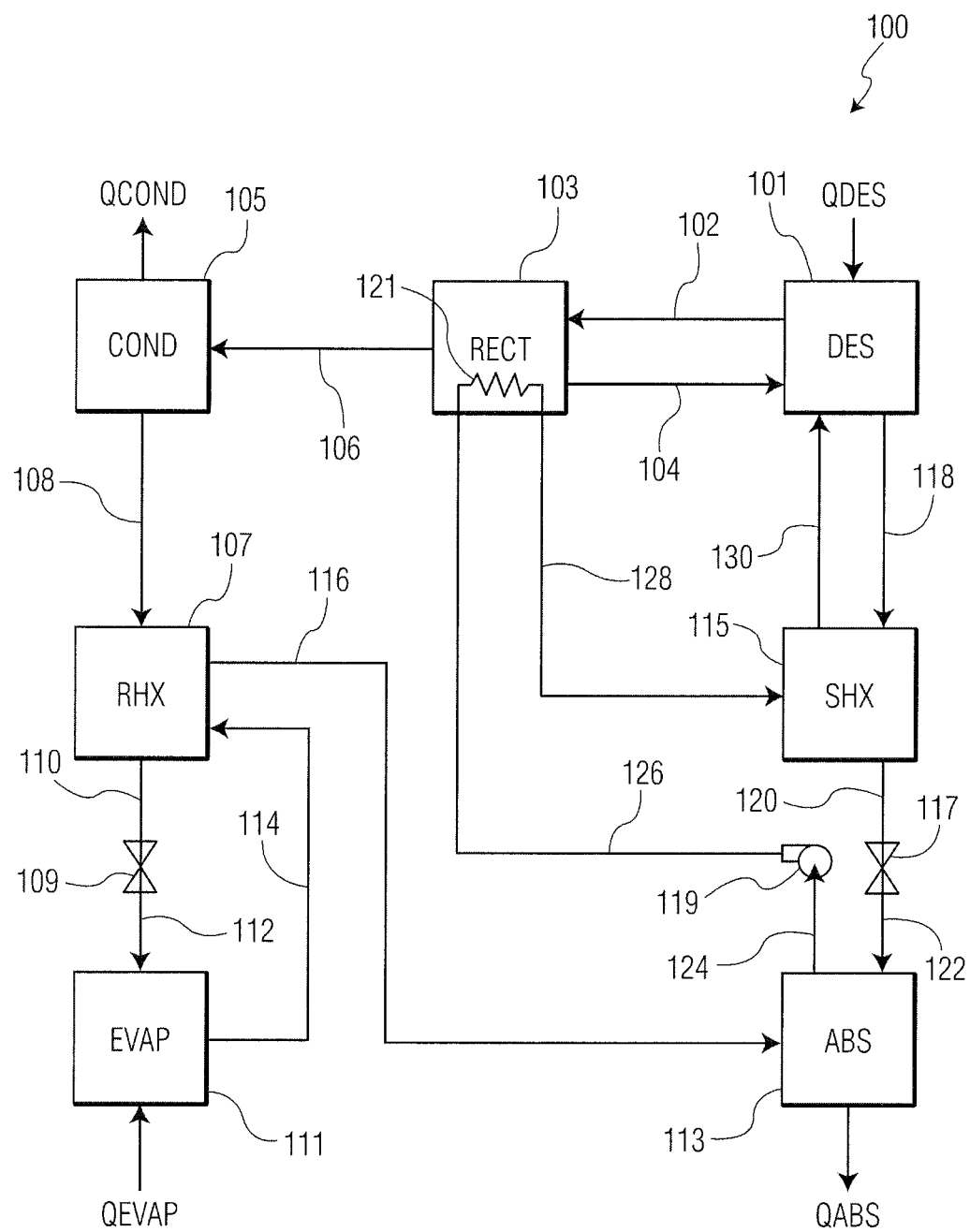
FIG. 1 is a schematic of an absorption heat pump cycle.

It will be appreciated that the following description is intended to refer to specific examples of structure selected for illustration in the drawings and is not intended to define or limit this disclosure, other than in the appended claims.

We provide a system and method of controlling a sorption heat pump comprising a condenser and an absorber, the method comprising measuring the temperature of hydronic fluid entering or exiting the condenser and controlling a flow rate of the hydronic fluid entering the condenser in response to the measured temperature, wherein the flow rate of hydronic fluid entering the condenser is reduced relative to a total potential flow rate when the temperature is below a pre-determined value.

We also provide a system and method of controlling a sorption heat pump comprising a condenser and an absorber, the method comprising controlling a flow rate of the hydronic fluid entering the condenser for a predetermined amount of time following activation of the heat pump from an off-mode.

A simple, single effect absorption heat pump cycle 100 is shown in FIG. 1. For the purposes of this description, the cycle is assumed to be a gas-fired $NH_3$—$H_2O$ cycle. However, any number of cycle configurations and working fluid pairs are possible and well-known in the industry.

A high temperature heat source (not shown) provides heat energy to a Desorber (DES) 101 which causes refrigerant ($NH_3$) to vaporize out of $NH_3$—$H_2O$ solution at high pressure (typically about 200-300 psia). The $NH_3$ vapor exits the Desorber 101 and is transferred to the Rectifier (RECT) 103 by rectifier $NH_3$ vapor supply line 102. The small amount of water vapor present in the $NH_3$ vapor stream in the Rectifier 103 may be removed by condensation line 104 and returned to the Desorber 101. Heat may be removed from the purified $NH_3$ vapor by transferring the purified $NH_3$ vapor to the Condenser (COND) 105 through condenser supply line 106 and causing the purified $NH_3$ vapor to condense into a liquid in the Condenser 105. The liquid $NH_3$ in Condenser 105 may be transferred by refrigerant heat exchanger liquid supply line 108 to the Refrigerant Heat Exchanger (RHX) 107. The liquid $NH_3$ may be cooled further in the Refrigerant Heat Exchanger (RHX) 107 and then reduced to low pressure (typically 50-150 psia) by transferring the liquid $NH_3$ from Refrigerant Heat Exchanger (RHX) 107 to a first restriction device 109 through first restriction device input line 110. The low pressure liquid $NH_3$ may then be transferred by first restriction device output line 112 to the Evaporator (EVAP) 111. The low pressure liquid $NH_3$ may be evaporated in the Evaporator (EVAP) 111 using heat from a low grade energy source (not shown) in the Evaporator (EVAP) 111, thereby cooling the low grade heat source. The evaporated $NH_3$ is transferred from Evaporator 111 to the Refrigerant Heat Exchanger 107 by refrigerant heat exchanger vapor supply line 114. In the Refrigerant Heat Exchanger 107, the evaporated $NH_3$ from refrigerant heat exchanger vapor supply line 114 is heated. The heated $NH_3$ vapor may then be transferred from the Refrigerant Heat Exchanger 107 to the Absorber (ABS) 113 by absorber supply line 116.

Hot, high pressure $NH_3$—$H_2O$ solution with a low concentration of $NH_3$ (often called "weak" solution) exits the Desorber 101 through weak solution supply line 118 and is transferred to the Solution Heat Exchanger (SHX) 115. The weak solution may be cooled in the Solution Heat Exchanger (SHX) 115. The cooled weak solution may then be reduced to a low pressure by transferring the cooled weak solution to a second restriction device 117 through a second restriction device input line 120. The low pressure, cooled weak solution may be transferred from the second restriction device 117 to the Absorber 113 by second restriction device output line 122. In the Absorber 113, the $NH_3$ vapor is absorbed back into the weak $NH_3$—$H_2O$ solution. This is an exothermic process, and the heat of absorption is preferably continually removed to keep the absorption process going.

The cooled, high $NH_3$ concentration solution (often called "strong" solution) exiting the Absorber 113 via absorber output line 124 may be pumped back to high pressure by pump 119 and transferred by strong solution supply line 126 to the coils 121 of Rectifier 103. The strong solution passes through the Rectifier coil 121 to cool and purify the $NH_3$ vapor. The strong solution may then be transferred from the Rectifier 121 to the Solution Heat Exchanger 115 by solution heat exchanger vapor supply line 128. The strong solution may then be pre-heated in the Solution Heat Exchanger 115 before entering the Desorber 101 through desorber vapor supply line 130 to start the process over.

Combustion of carbon fuels, solar, waste heat or the like can also be used to provide high grade heat to Desorber 101. The Evaporator 111 may utilize a direct refrigerant to air fin-tube coil heat exchanger, or an indirect refrigerant to hydronic working fluid heat exchanger. One advantage of the indirect method is a possible reduction in total refrigeration charge.

Figure 2:
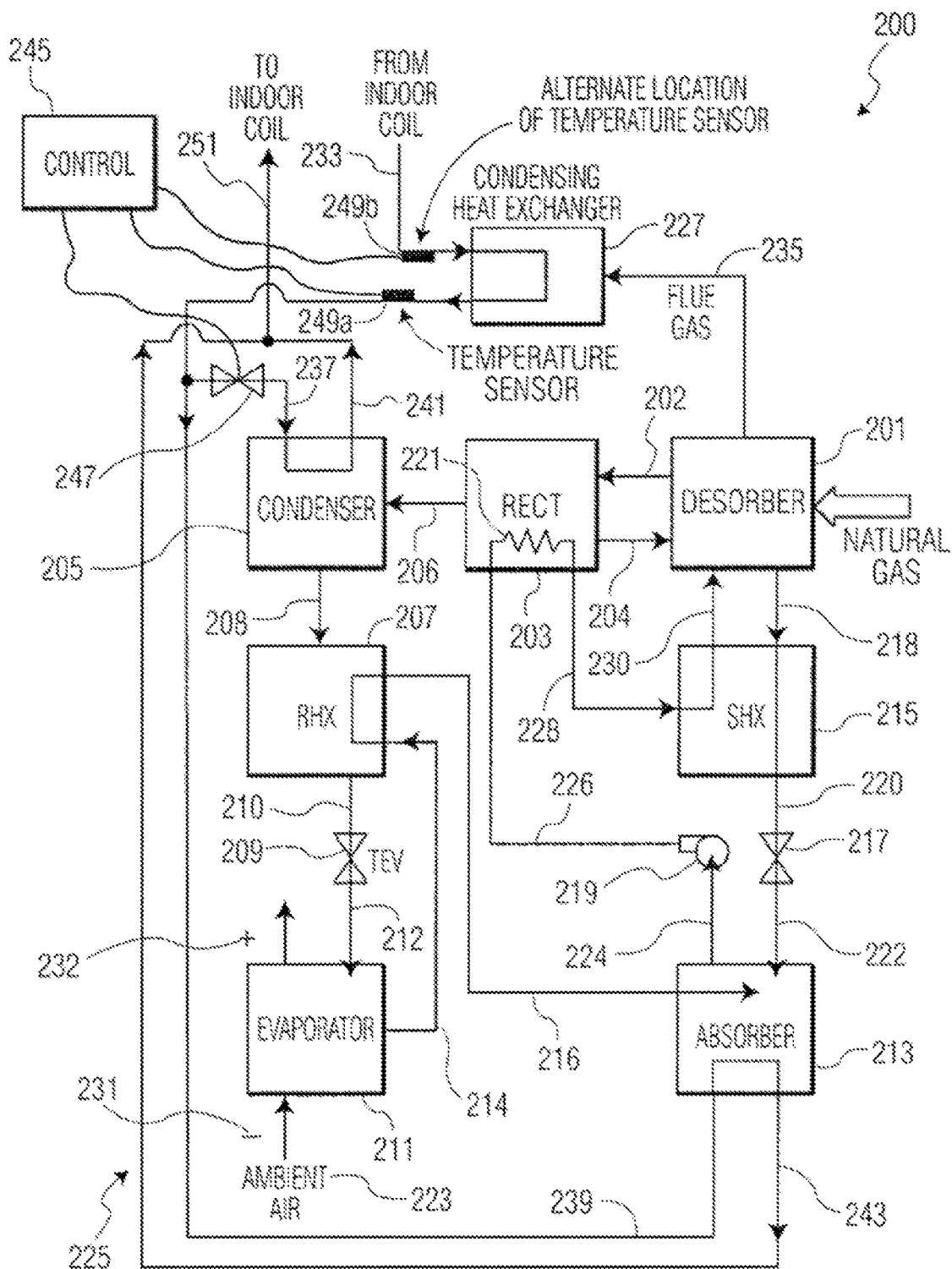
FIG. 2 is a schematic of an exemplary absorption heat pump cycle with a control valve.

FIG. 2 depicts a simple, single effect absorption heat pump cycle 200, configured for space or water heating having a controller. The Desorber 201, Rectifier 203, Condenser 205, Refrigerant Heat Exchanger 207, Evaporator 211, Absorber 213, and Solution Heat Exchanger 215 are arranged as described in FIG. 1.

However, FIG. 2 shows ambient air 223 as the low temperature heat source, which passes through Evaporator 211 causing the refrigerant to boil. The ambient air 223 enters the Evaporator 211 by evaporator heat source input line 231 and exits the Evaporator 211 by evaporator heat source output line 232. The ambient air 223 could be sourced from outside or inside a building.

FIG. 2 additionally shows a hydronic (water or glycol-water mixture for example) loop 225 that transfers heat from the absorption heat pump to the load to be heated. FIG. 2 specifies the load as an Indoor Coil, which can be, for example, an air-coupled heat exchanger for space heating, a heat exchanger connected to a water tank to heat water or the like. The hydronic fluid, cooled by the load, may first be transferred to an optional Condensing Heat Exchanger (CHX) 227 by hydronic input line 233. Condensing Heat Exchanger 227 serves to further cool the high temperature Desorber 201 heating source, to reduce losses (in this case, combustion of a carbon fuel is assumed). When the temperature of the hydronic fluid from hydronic input line 233 is below the dew point of the flue gases exiting the Desorber 201, water vapor in the flue gas line 235 exiting the Desorber 201 can be condensed and transferred to the Condensing Heat Exchanger 227, significantly decreasing energy losses from the flue gas.

After exiting the Condensing Heat Exchanger 227, the hydronic fluid enters the Condenser 205 and Absorber 213 to collect the heat of condensation and absorption from the heat pump cycle. The hydronic can flow through the Condenser 205 and Absorber 213 in series, parallel, or some combination thereof. A parallel configuration is shown in FIG. 2, where a portion of the hydronic flow enters the Condenser 205 via condenser hydronic flow input line 237, while the remaining hydronic flow enters the Absorber 213 via absorber hydronic flow input line 239. After exiting the Condenser 205 and Absorber 213 via condenser hydronic flow output line 241 and absorber hydronic flow output line 243, the heated hydronic flow re-combines and travels to the load to be heated via hydronic fluid output line 251. For a parallel flow arrangement, the percentage of the total hydronic flow that passes through the condenser 205 often depends on the particular cycle chosen, or the specific application. Generally, the hydronic flow split percentage is similar to the heating capacity ratio of the condenser/absorber, which is often around 60% absorber.

The hydronic flow split percentage can be regulated by Control 245 which operates valve 247. Optionally, the Control 245 may operate valve 247 depending on the temperature of the hydronic fluid entering or exiting the condensing heat exchanger 227. For example, the Control 245 may reduce the flow rate of hydronic fluid entering or exiting the condenser relative to a total possible flow rate when the temperature is below a pre-determined value such as below a temperature of about 70-90° F. To measure the temperature of the hydronic fluid, a temperature sensor 249a may be employed in hydronic input line 233 upstream of the condensing heat exchanger 227 or, alternatively, a temperature sensor 249b may be employed in hydronic input line 233 downstream of the condensing heat exchanger 227.

FIG. 2 shows a valve 247 in the condenser hydronic flow input line 237 where it enters the Condenser 205. The valve 247 can be of the ON/OFF or variable position type. The position of the valve 247 (full open, full closed, or somewhere in-between) is controlled by a controller 245 in response to the temperature of the hydronic fluid exiting the condensing heat exchanger 227 (or alternatively, entering the condensing heat exchanger 227). Temperature sensor 249a and 249b (such as thermocouple, RTD, thermistor or other temperature measurement devices) are attached to the hydronic input line 233, so that the temperature of the hydronic fluid entering or exiting the condensing heat exchanger 227 is known.

When the temperature of the hydronic fluid entering the Condenser 205 is below a pre-determined value, the controller 245 acts to close, or partially close the valve 247 to stop or reduce the flowrate of hydronic fluid through the condenser 205. By stopping or reducing the hydronic flow rate through the Condenser 205, the temperature of the refrigerant exiting the Condenser 205 via condenser hydronic flow output line 241 is increased, causing the high side pressure to increase. This control method keeps the high side pressure above a minimum value, ensuring that the pressure difference between the high and low side pressures is high enough to allow the working fluids to flow at a high enough rate through the pressure restrictions devices 209 and 217 to keep the heat pump cycle 200 operating properly.

By stopping or reducing the hydronic flow rate through the condenser 205 in this manner, higher than normal hydronic flow rate will pass through the Absorber 213, causing the strong solution exiting the Absorber 213 via absorber hydronic flow output line 243 to exit at a lower temperature. Since the efficiency of the heat pump cycle 200 increases with decreasing temperature of the strong solution exiting Absorber 213 in line 224, the extra flow rate through the Absorber 213 during periods when the control 245 is working to close or partially close the valve will cause the heat pump to operate at a higher efficiency.

The hydronic flow rate through the Condenser 205 can be controlled, based on the temperature of the hydronic fluid entering the Condenser 205, using a simple ON/OFF valve, multi-position valve, or proportional valve (shown generically as 247). An ON/OFF valve provides the simplest and least expensive option. If an ON/OFF valve is used, the control 245 can be configured to turn the valve 247 ON and OFF on pre-determined intervals, based on the temperature of the hydronic fluid. For example, if the hydronic fluid was very cold, the control 245 would act to keep the valve OFF for a longer duration that it was ON. As the hydronic temperature increases, the time intervals of the ON and OFF cycles can be adjusted accordingly (more time ON, less time OFF) to maintain an approximate minimum high side pressure based on the hydronic fluid temperature entering the Condenser 205. When the hydronic temperature increases to a pre-determined value, the control 245 can keep the valve 247 open at all times, allowing "normal" heat pump operation. Note that during periods when the valve 247 is OFF (closed), all of the hydronic flow by-passes the Condenser 205 and flows through the Absorber 213.

When a multi-position or proportional valve is used, the controller 245 may act to position the valve 247 in a predetermined position based on the hydronic temperature entering the Condenser 205. For example, if the hydronic temperature is very cold, the valve may be set to a position more closed (by-passing more hydronic flow to the Absorber 213), compared to when the hydronic temperature is warmer. When the hydronic temperature increases to a pre-determined value, the control 245 may keep the valve 247 open at all times, allowing "normal" heat pump operation.

When an absorption heat pump 200 has been off (not running), normally the high and low side pressures equalize to a pressure between the normal high and normal low. As the heat pump working fluids continue to cool, this equalized "system" pressure will continue to decay until reaching the saturation pressure based on the refrigerant concentration and the ambient temperature. When the heat pump 200 is activated from the off-state, it is desirable for the high side pressure to increase as quickly as possible, and the low side pressure to decrease as quickly as possible, for the heat pump 200 to reach maximum heating or cooling capacity as quickly as possible.

Therefore, during a start-up condition (the first 5 to 20 minutes after the heat pump cycle is activated, for example), an alternate valve control methodology may be utilized. Since the high side pressure will increase more quickly if the hydronic flow rate through the Condenser 205 is stopped or reduced, it is desirable for the control 245 to close the valve 247 for a period of time during the start-up period. When the valve is closed, the hydronic flow rate through the Absorber 213 will be increased, which allows the low side pressure to decrease faster.

During heat pump start-up periods, the time periods used by the controller 245 to turn the valve 247 ON or OFF based on the hydronic temperature entering the Condenser 205 may be different from steady-state operation use (or the position of the valve if a multi-position or proportional valve is used). For example, the controller 245 may be programmed to close (or partially close) the valve 247 for a pre-determined period of time during start-up, regardless of what the hydronic temperature is (although the period of time may be a function of the hydronic temperature). The ON/OFF time periods (or valve position) as a function of the hydronic temperature may be slightly different during start-up periods compared to steady-state conditions, such that the heat pump system 200 reaches maximum capacity and efficiency as fast as possible.

Figure 3:
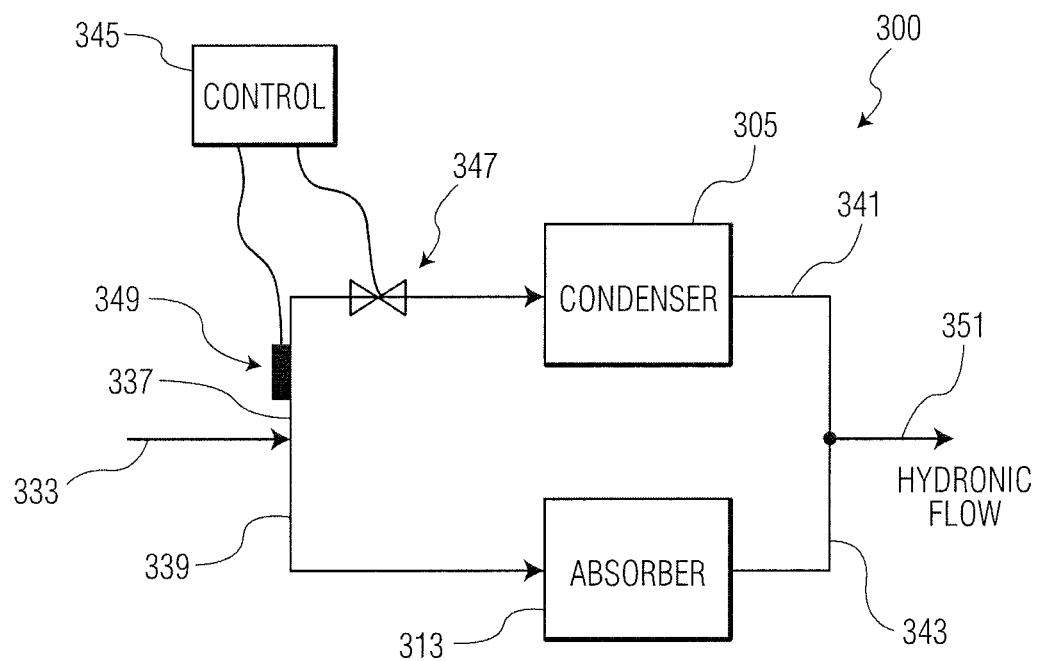
FIG. 3 is a schematic of an alternative exemplary absorption heat pump cycle with a control valve.

In FIG. 3, a simplified view heat pump cycle 300 with a hydronically cooled Condenser 305 and Absorber 313 in parallel configuration is shown with a valve 347 located in the condenser hydronic flow input line 237 at the inlet to the Condenser 305, a temperature sensor 349 located to measure the temperature of the hydronic entering the Condenser 305, and a control 345 configured to control the position of the valve 347 in relation to the hydronic temperature. With this arrangement, the portion of the hydronic flow that does not pass through the Condenser 305 passes through the Absorber 313, further cooling the working fluids in the Absorber 313, increasing the heat pump efficiency.

Figure 4:
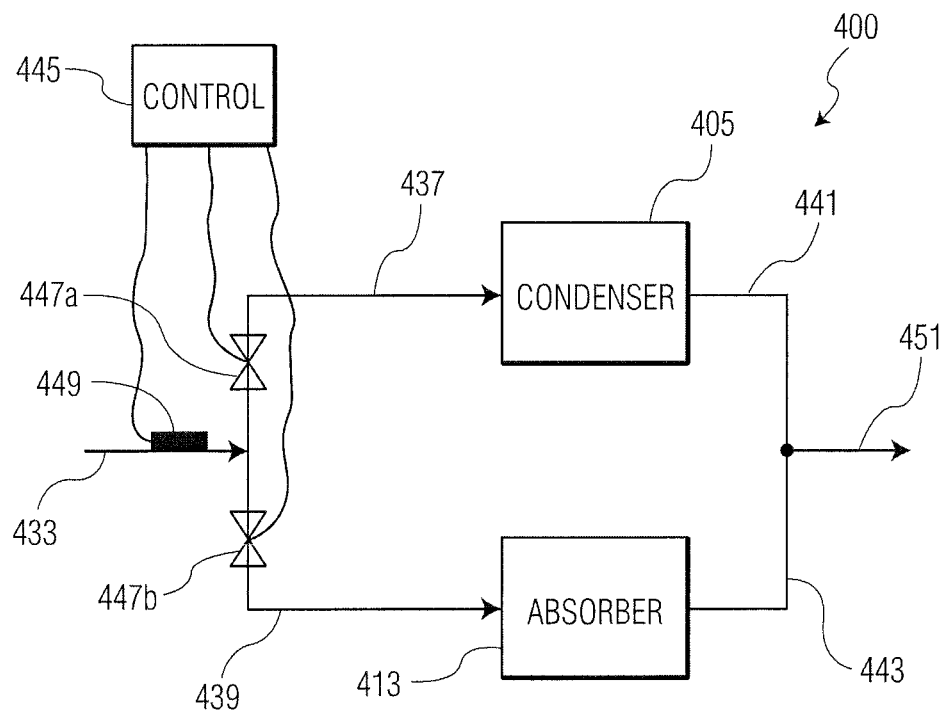
FIG. 4 is a schematic of an alternative exemplary absorption heat pump cycle with two control valves.

In FIG. 4, a heat pump cycle 400 with a similar Absorber-Condenser parallel configuration is shown, with the addition of a second valve 447b located in the absorber hydronic flow input line 439. The position of both valves (447a and 447b) is controlled by a controller 445 connected to a temperature measurement device 449 located to measure the hydronic temperature entering the Condenser 405-Absorber 413. With this configuration, the hydronic flow rate through the Absorber 413 may be stopped or reduced depending on the hydronic fluid temperature, with the portion of the hydronic flow not passing through the Absorber 413 passing through the Condenser 403 (which acts to further cool the Condenser 403 and reduce the high side pressure). This arrangement may be beneficial for systems that require delivery of very hot hydronic temperatures to the load. When the hydronic temperature increases to a pre-determined temperature, indicative of a maximum high side pressure allowable by the heat pump components, the control 445 can act to stop or reduce the hydronic flow through the Absorber 413, allowing the Condenser 405 to run cooler and limit the high side pressure. As noted before, if the valve 447a and/or 447b is of the ON/OFF type, the controller 445 can act to turn the valve 447a and/or 447b ON/OFF at different periods based on the hydronic temperature. This arrangement, by reducing the hydronic flow through the Absorber 413, may decrease the efficiency of the heat pump, but it will allow the heat pump to provide higher hydronic temperatures to the load if required. Alternatively, flow through the condenser can also be controlled using valve 447b. During normal operation, valve 447b is set to a semi-open position. When it is desired to decrease the flow through hydronic flow through the condenser, valve 447b is opened, which reduces the pressure loss of the hydronic fluid flowing through the absorber leg relative to the condenser leg, thereby increasing the flow through the absorber and decreasing flow through the condenser.

In another example of a heat pump cycle, flow through the condenser can also be controlled using valve 447b. During normal operation, valve 447b is set to a semi-open position. When it is desired to decrease the flow through hydronic flow through the condenser, valve 447b may be opened. This reduces the pressure loss of the hydronic fluid flowing through the absorber leg relative to the condenser leg thereby increasing the flow through the absorber and decreasing flow through the condenser.

Figure 5:
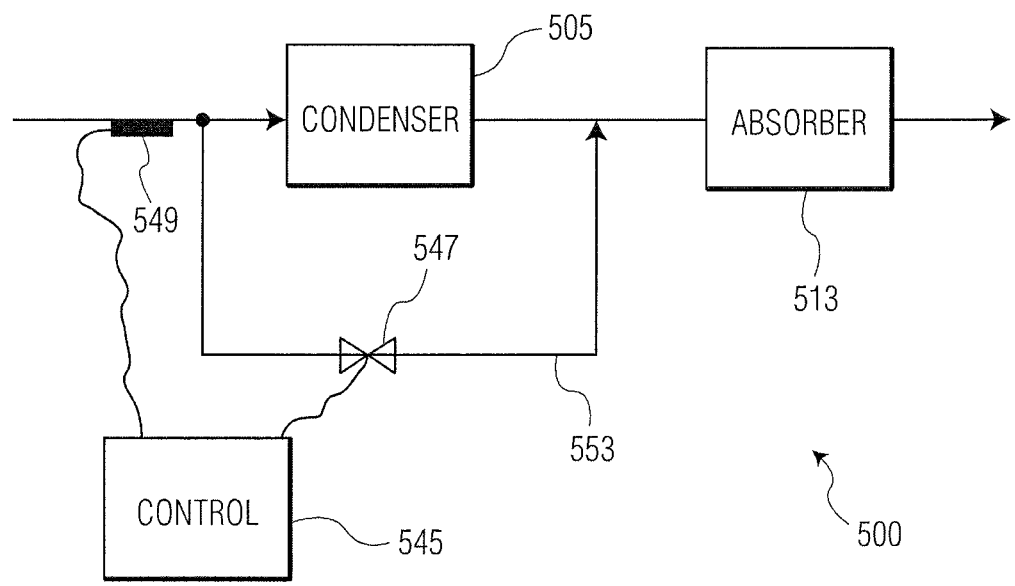
FIG. 5 is a schematic of an alternative exemplary absorption heat pump cycle with a control valve in a by-pass line.

In FIG. 5 shows a heat pump cycle 500 with an Absorber 513 and Condenser 505 tied to a hydronic loop in series configuration (Condenser 505 first is shown). In this case, the valve 547 is located in a by-pass line 553 around the Condenser 505. During normal operation, the valve 547 may be closed, thereby forcing all of the hydronic flow through the Condenser 505. If the hydronic temperature entering the Condenser 505 is below a pre-determined value (or during a heat pump start-up sequence), the controller 545 can open (or partially open) the valve 547, allowing all or a portion of the hydronic flow to by-pass the Condenser 505 via by-pass line 553. With this arrangement, if the valve is open, the temperature of the hydronic entering the Absorber 513 will be lower compared to a closed valve, thereby increasing cooling in the Absorber 513 and increasing heat pump efficiency.

Figure 6:
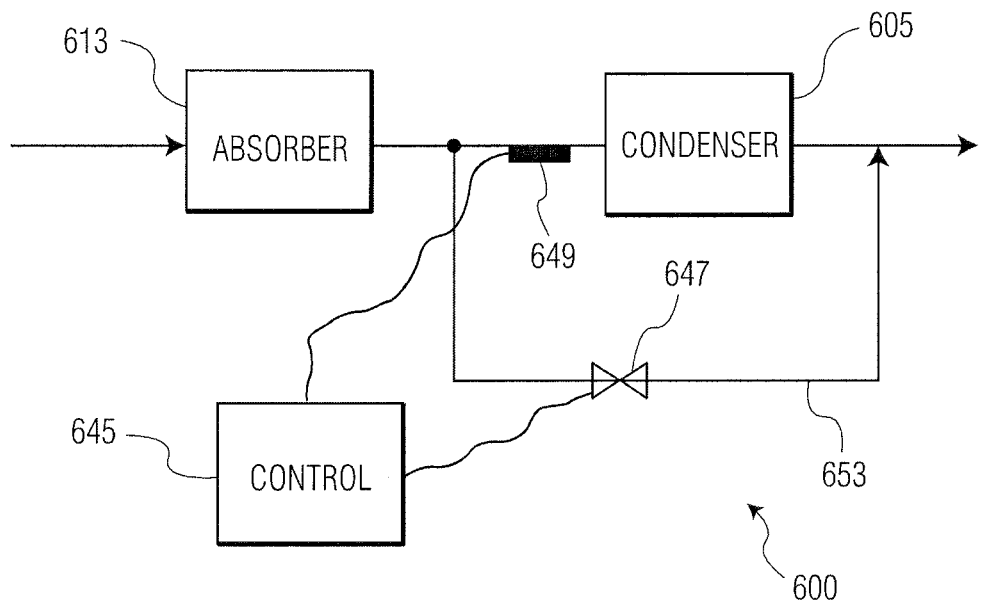
FIG. 6 is a schematic of yet another alternative exemplary absorption heat pump cycle with a control valve in a by-pass line.

FIG. 6 shows a heat pump cycle 600 with an Absorber 613 and Condenser 605 tied to a hydronic loop in series configuration (Absorber 613 first is shown). In this case, the valve 647 is located in a by-pass line 653 around the Condenser 605. During normal operation, the valve 647 may be closed, thereby forcing all of the hydronic flow through the Condenser 605. If the hydronic temperature entering the Condenser 605 is below a pre-determined valve (or during a heat pump start-up sequence), the controller 645 can open (or partially open) the valve 647, allowing all or a portion of the hydronic flow to by-pass the Condenser 605 via by-pass line 653. With this arrangement, the cooling capacity (and heat pump efficiency) is not impacted by the position of the valve since all of the hydronic flow can first pass through the Absorber 613.

Although the apparatus and methods have been described in connection with specific forms thereof, it will be appreciated that a wide variety of equivalents may be substituted for the specified elements described herein without departing from the spirit and scope of this disclosure as described in the appended claims.

What is claimed is:

1. A method of controlling a sorption heat pump comprising a condenser and absorber, the absorber and condenser being arranged in parallel with respect to the hydronic flow, the method comprising:
   a) measuring the temperature of hydronic fluid entering or existing in the condenser; and
   b) controlling a flow rate of the hydronic fluid entering the condenser in response to the temperature measured in a) to reduce the flow rate of hydronic fluid entering the condenser relative to a total possible flow rate and proportionally increase the flow rate of the hydronic fluid entering the absorber when the temperature is below a pre-determined value.

2. The method of claim 1, wherein (i) reducing the flow rate of the hydronic fluid entering the condenser reduced relative to a total possible flow rate proportionally increases a flow rate of the hydronic fluid entering the absorber and (ii) increasing the flow rate of the hydronic fluid entering the condenser reduced relative to a total possible flow rate proportionally decreases the flow rate of the hydronic fluid entering the absorber.

3. The method of claim 1, wherein the flow rate of the hydronic fluid entering the condenser is controlled by at least partially closing or partially opening a valve.

4. The method of claim 3, wherein the valve is in a supply line supplying hydronic fluid to the condenser.

5. The method of claim 3, wherein the valve is in a supply line supplying hydronic fluid to the absorber.

6. The method of claim 3, wherein the valve is in a by-pass line that bypasses the condenser.

7. The method of claim 6, wherein the by-pass line bypasses the condenser and supplies hydronic fluid to the absorber.

8. The method of claim 3, wherein the valve is selected from the group consisting of an ON/OFF valve, a multi-position valve and a proportional valve.

9. The method of claim 3, wherein the valve is closed for about 5 to about 20 minutes following activation of the heat pump from an off mode.

10. The method of claim 1, wherein the flow rate of the hydronic fluid entering the condenser is reduced relative to a total possible flow rate for about 5 to about 20 minutes following activation of the heat pump from an off mode.

11. The method of claim 1, wherein the pre-determined value is about 70 to about 90° F.

\* \* \* \* \*